United States Patent [19]

Houley et al.

[11] Patent Number: 4,610,181

[45] Date of Patent: Sep. 9, 1986

[54] POWER TRANSMISSION DEVICE FOR STARTING IN FORWARD OR REVERSE

[75] Inventors: Daniel Houley, Colombes; Patrice Baudoin, L'Etang la Ville, both of France

[73] Assignee: Regie Nationale des Usines Renault, Boulogne-Billancourt, France

[21] Appl. No.: 607,501

[22] Filed: May 7, 1984

[30] Foreign Application Priority Data

May 6, 1983 [FR] France ................... 83 07651

[51] Int. Cl.[4] ................ F16H 3/44; F16H 57/10; F16D 11/06
[52] U.S. Cl. ....................... 74/792; 74/790; 192/18 A
[58] Field of Search ............ 74/792, 791, 790, 789; 192/18 A, 87.11, 87.13

[56] References Cited

U.S. PATENT DOCUMENTS

| 2,174,672 | 10/1939 | Von Soden-Fraunhoffen | 74/763 |
| 2,870,655 | 1/1959 | Rockwell | 192/18 A |
| 3,020,990 | 2/1962 | Liu | 192/18 A |
| 3,069,929 | 12/1962 | Hansen | 192/18 A |
| 3,131,582 | 5/1964 | Kelbel | 74/788 |
| 3,563,114 | 7/1969 | Casale | 74/792 |
| 3,685,371 | 8/1972 | Crooks | 74/792 |
| 3,710,650 | 1/1973 | Piret | 192/87.11 X |
| 3,728,913 | 4/1973 | Nagasaki | 74/785 |
| 3,741,037 | 6/1973 | Piret | 74/789 |
| 4,010,833 | 3/1977 | Brendel et al. | 192/87.11 |
| 4,440,282 | 4/1984 | Ishimaru et al. | 192/18 A |

FOREIGN PATENT DOCUMENTS

| 1450784 | 1/1970 | Fed. Rep. of Germany . |
| 1530227 | 6/1968 | France . |
| 2325851 | 4/1977 | France . |
| 0000654 | 1/1983 | Japan ................. 74/792 |

Primary Examiner—Kenneth J. Dorner
Assistant Examiner—Stephen B. Andrews
Attorney, Agent, or Firm—Oblon, Fisher, Spivak, McClelland & Maier

[57] ABSTRACT

A power transmission device for starting in forward or reverse, particularly for a motor vehicle having a heat engine, characterized in that it comprises a simple three-pinion planetary gear train associated with a clutch and brake to give reduced energy dissipation during starting in reverse.

10 Claims, 3 Drawing Figures

POWER TRANSMISSION DEVICE FOR STARTING IN FORWARD OR REVERSE

BACKGROUND OF THE INVENTION

This invention relates to a power transmission device for starting in forward or reverse.

Numerous devices for starting in forward or reverse exist for motor vehicles having a heat engine, of which there can be cited:

1. Dry or wet, single-disk or multidisk, manual or automatic clutches, the latter being, for example, of the centrifugal type with a flywheel, couplings, converters, in association with reversing devices; and 2. A six-pinion planetary gear train including a clutch and brake.

All these devices have drawbacks either of cost or of energy consumption or overall size and weight or effort in use.

SUMMARY OF THE INVENTION

The purpose of this invention is to make a power transmission device for starting in forward or reverse, particularly for motor vehicles having a heat engine, associating a simple three-pinion planetary gear train, a clutch and brake causing reduced energy dissipation during starting in reverse.

For this purpose, the invention has as its object a device that comprises, on the one hand, a simple planetary gear train and, on the other hand, a brake and clutch both consisting of a single disk with two friction linings, said clutch and brake being fixed in rotation with one of the flanges of the pinion carrier. The device according to the invention further comprises springs that are placed between the plates and counterplates of the clutch and brake.

According to an embodiment of the invention, the pinion carrier flange, which carries the clutch and brake disk, is a drawn and stamped sheet metal cover, which by the notches located on its periphery provides a connection in rotation with said disks. The clutch cylinder is fixed in rotation with the input shaft. The clutch disk and brake disk are one and the same disk.

The cover, which carries the single disk, has an annular deformation that acts as an oil collector during rotation, which works with radial orifices bringing the oil to the friction linings carried by said disk.

The clutch and brake cylinders are located on both sides of the plane of the disk carrying the friction linings, in an opposite direction in relation to the axial direction, so that the counterplates of the brake and clutch pistons are positioned axially to center the disk in the middle of the plates of the unapplied element.

According to an embodiment of the invention, the clutch cylinder is fixed in rotation with the output shaft. The pinion carrier flange which carries the clutch and brake disks is a drawn and stamped sheet metal cover which by the notches located on its periphery assures a connection in rotation with said disks.

The clutch disks and brake disk are the, same single disk. The clutch and brake cylinders are located in an opposite direction in relation to the axial direction so that the counterplates of the pistons of the brake and clutch are positioned axially to center the disk in the middle of the plates of the unapplied element.

According to an embodiment of the invention, the clutch cylinder is fixed in rotation with the output shaft. The pinion carrier flange, which carriers the clutch and brake disks, is a drawn and stamped sheet metal cover, which by the notches located on its periphery assures a connection in rotation with said disks.

The brake disc is dissociated from the clutch disk and is located on the inside of the cover. The brake plates are carried by a hub that is an integral part of the housing, said hub comprising a needle bearing carrying the input shaft.

According to an embodiment, the clutch cylinder is fixed in rotation with the output shaft. The brake disk is dissociated from the clutch disk. The pinion carrier flange, which carries the clutch and brake disks, is a drawn and stamped sheet metal cover which by the notches located on its periphery assures a connection in rotation with said disks. The clutch and brake cylinders are located on the same side of the planes of the disks in the same direction in relation to the axial direction.

This device according to the invention offers the following advantages.

The movement enters by the sun gear of the planetary gear train and levels by its ring gear.

Forward is obtained by coupling any two of the three elements of the train for example the pinion carrier and the sun gear or the pinion carrier and the ring gear.

The transmission ratio of the device, defined as being the ratio of output speed to input speed is then +1.

Reverse is obtained by immobilizing the pinion carrier in relation to the housing by a brake. The transmission ratio is then ordinarily between −0.4 and −0.8.

Starting conditions being imposed, the energies dissipated in the case of a reverse start will thereby be much less than in the case of a forward start.

Even if the engine torque is limited so that the wheel torque is the same as that which would be obtained in forward, in the case of reverse starting, the dissipated energy for the preceding outside values will be only 16 and 64%, respectively, of that dissipated in forward.

Since the surfaces of the friction linings are often determined by the energies to be dissipated, the specific energy being given, the undersizing of the brake lining or linings, which results from the use of a simple three-pinion train, is possible.

Thus, a device is obtained according to the invention that is compact with a slight drag and a reduced cost.

BRIEF DESCRIPTION OF THE DRAWINGS

Other characteristics and advantages of this invention will come out from the following description of embodiments given by way of example, with reference to the accompanying drawings in which.

DETAILED DESCRIPTION OF THE PREFERRED EMBODIMENT

Figure 1:
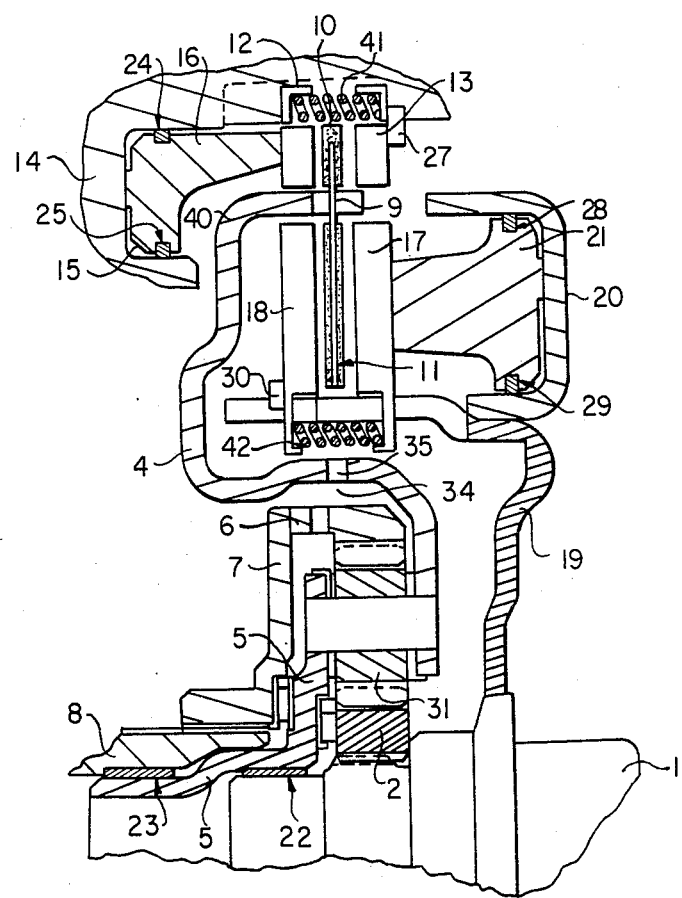
FIG. 1 represents in longitudinal section a half view of the device of the invention according to a first embodiment.

In a first embodiment of the invention shown in FIG. 1, an engine (not shown) drives a shaft 1 which is the input shaft of the device of the invention. A shock absorber (not shown) can be put between the engine and this shaft. Shaft 1 drives a sun gear 2 in rotation. The latter meshes with three planet gears or pinions, preferably three, namely 31, 32 and 33. The pinion carrier consists of two flanges 4 and 5 connected by the pinion shafts.

A ring gear 6 completes the planetary gear train. It is fastened to flange 7 which drives output shaft 8 of the invention in rotation. In the first embodiment of the invention, pinion carrier flange 4 which can be made of drawn sheet metal, is in the form of a double cover and carries a single disk 9 extending radially on both sides of outside wall 40. Friction linings 10 and 11 of the brake and clutch, respectively, are fastened to this disk.

Each of these linings 10 and 11 will advantageously be double or biface.

Biface lining 10 of the brake works with a plate 12 and a counterplate 13 immobilized in rotation by suitable connections to housing 14.

A hydraulic cylinder, consisting of an annular chamber 15 in this housing and an annular piston 16, seals 24 and 25 and lock ring 27 of counterplate 13 complete the device.

Biface lining 11 of the clutch works with a plate 17 and a counterplate 18 which are carried by a cover 19 fixed to shaft 1.

This cover assures driving of plates 17 and 18 in rotation. It can be made of drawn sheet metal and welded to shaft 1. It also carries a hydraulic cylinder consisting of annular chamber 20 and an annular piston 21. The device is completed by seals 28 and 29 and a lock ring 30.

By its shape, pinion carrier flange 4 makes it possible to position the planetary gear train substantially coplanar with disk 9, which makes it possible to reduce the axial overall dimensions of the device. This flange 4 also has an annular deformation 34 pierced with radial orifices 35 which act as an oil collector and make lubricating and cooling of linings 10 and 11 possible.

The brake and clutch cylinders are located on either side of the plane of disk 9. Thus, and to the extent that counterplates 13 and 18 are judiciously positioned axially, disk 9 is centered between the plates of the unapplied element (when the other is applied). This makes a reduction of parasitic drag possible.

Spacing elements, for example springs 41 and 42, can be incorporated in the device to assure spacing of plates 12 and 13, on the one hand, and 17 and 18, on the other hand, in the absence of control pressure in chambers 15 and 20.

Positioning of the pinion carrier is assured by rings 22, and optionally 23, placed on shaft 1 and in shaft 8, respectively.

Figure 2:
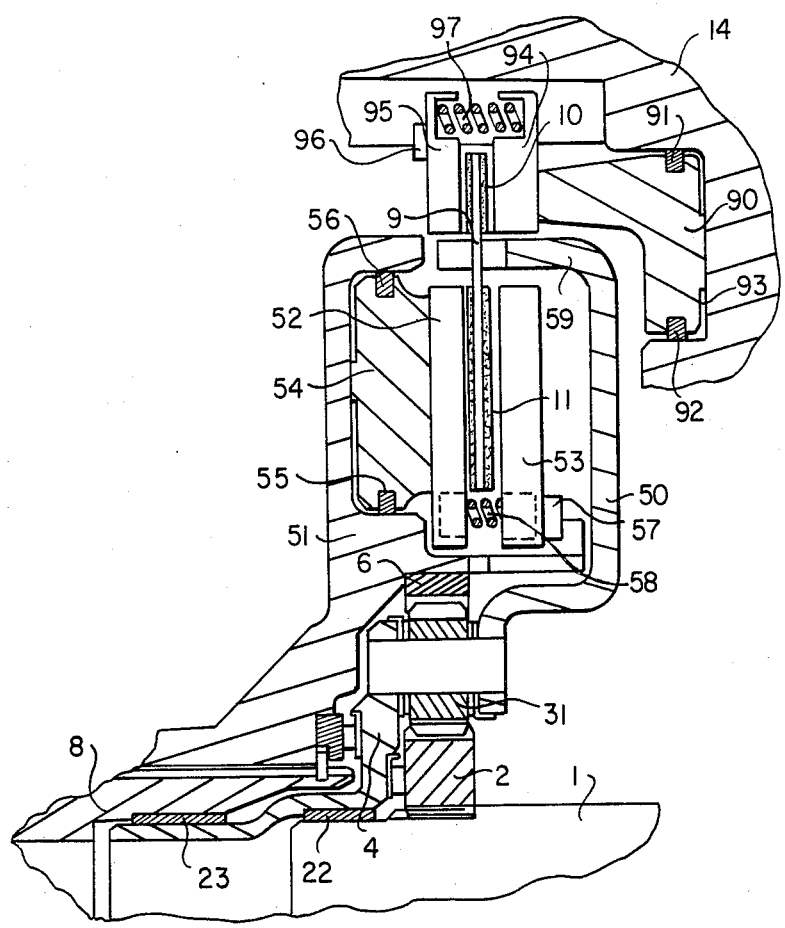
FIG. 2 represents in longitudinal section a half view of the device of the invention according to a second embodiment.

In a second embodiment of the invention shown in FIG. 2, an engine (not shown) drives shaft 1 which is the input shaft of the device of the invention. A shock absorber (not shown) can be put between the engine and this shaft. Shaft 1 drives a sun gear 2 in rotation. The latter meshes with three planet pinions 31, 32 and 33. The pinion carrier consists of two flanges 4 and 50. A ring gear 6 completes the planetary gear train. It is fastened to a cover 51 which drives output shaft 8 of the device in rotation.

Flange 50 of the pinion carrier, which can be made of drawn sheet metal, is in the shape of a cover and carries a single disk 9 extending radially on both sides of an outside wall 59.

Two friction linings 10 and 11 of the brake and clutch, respectively, are fastened to this disk. Each of these linings 10 and 11 will advantageously be double or biface. Biface lining 10 of the brake works with a plate 94 and a counterplate 95 immobilized in rotation by suitable connections to housing 14. A hydraulic cylinder, consisting of an annular chamber 93 in this housing and an annular piston 90, and seals 91 and 92 complete the device. Lock ring 96 of counterplate 95 and spacing springs 97 complete the brake.

In a second embodiment of the invention (FIG. 2), the clutch cylinder is fixed in rotation with shaft 8.

Consequently, in the absence of a control pressure in the clutch cylinder or the brake cylinder, which in any case does not turn, the engine can make shaft 1 turn at high speeds without shaft 8 being put into rotation.

In the first embodiment this was not the case: a centrifugal dynamic pressure could appear in the clutch cylinder in the absence of this control pressure.

In this second embodiment, flange 50 of the pinion carrier is simplified. On the other hand, cover 51 can be obtained as an aluminum casting, in which ring gear 6 is fastened, and said cover 51 still drives shaft 8. This cover 51 carries and drives plate 52 and counterplate 53 of the clutch in rotation. This cover 51 also carries annular piston 54.

Seals 55, 56, lock ring 57 and spacing springs 58 complete the clutch.

The brake and clutch cylinders are located on both sides of the plane of disk 9. Thus, and to the extent the counterplates 53 and 95 are judiciously positioned axially, disk 9 is centered between the plates of the unapplied element (when the other is applied). This makes a reduction of parasitic drag possible.

Positioning of the pinion carrier is assured by rings 22, and optionally 23, placed on shaft 1 and in shaft 8, respectively.

In a variant of this embodiment, the two friction linings of the brake and clutch are no longer carried by a single disk but by two disks. The claimed advantage disappears but, if necessary, the two cylinders can be placed on the same side of their respective disks.

Figure 3:
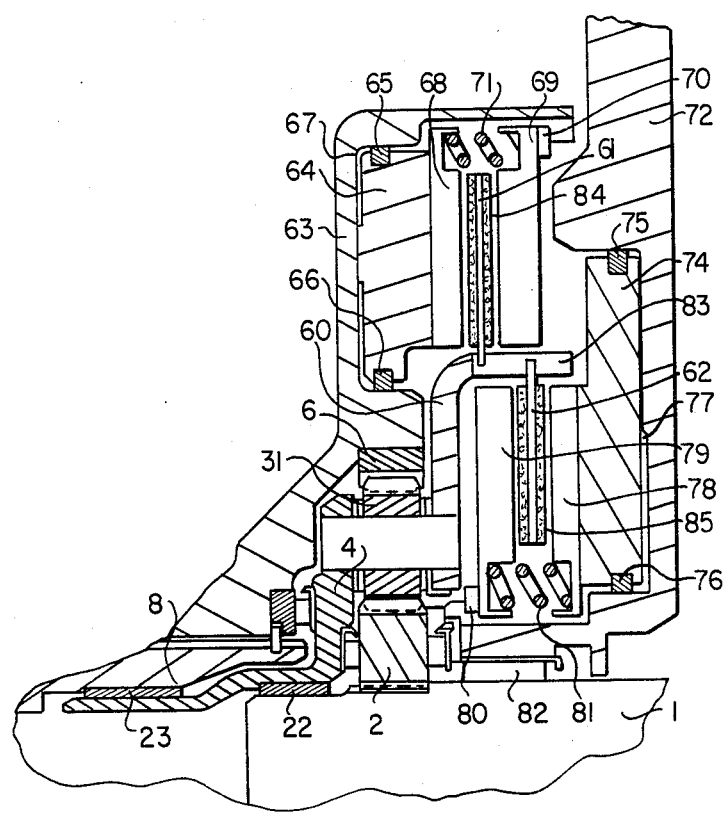
FIG. 3 shows in longitudinal section a half view of the device of the invention according to a third embodiment.

In a third embodiment of the invention shown in FIG. 3, an engine (not shown) drives shaft 1 which is the input shaft of the device of the invention.

A shock absorber (not shown) can be put between the engine and this shaft.

Shaft 1 drives a sun gear 2 in rotation. The latter meshes with the three planetary pinions 31, 32 and 33. The pinion carrier consists of two flanges 4 and 60.

A ring gear 6 completes the planetary gear train. It is fastened to a cover 63 which drives output shaft 8 of the device in rotation.

Flange 60 of the pinion carrier, which can be made of drawn sheet metal, is in the form of a cover and carries clutch disk 61 and brake disk 62 extending radially on both sides of an outside wall 83. Two friction linings 84 and 85 of the clutch and brake, respectively, are fastened to these disks 61 and 62. Each of these linings 84 and 85 will advantageously be double or biface. Disk 62 of the brake is therefore dissociated from clutch disk 61. Biface brake lining 85 works with a plate 78 and a counterplate 79 immobilized in rotation by suitable connections to hub 72 fixed to the housing of the device.

A hydraulic cylinder, consisting of an annular chamber 77 in this housing and an annular piston 74, and seals 75 and 76 complete this device. Lock ring 80 of counterplate 79 and spacing springs 81 complete the brake.

Cover 63 contains the clutch cylinder, consisting of an annular piston 64 with seals 65 and 66, an annular chamber 67, plate 68 and counterplate 69, a lock ring 70 and spacing springs 71.

A needle bearing 82 housed in hub 72 makes it possible to center shaft 1. Positioning of the pinion carrier is assured by rings 22, and optionally 23, placed on shaft 1 and in shaft 8, respectively.

As a variant of the third embodiment, the disk carrying the brake lining is positioned differently. To reduce the drag of the brake when it is not applied, which is the case on a vehicle moving forward, the average radius of the disk is reduced.

To reduce as much as possible the axial and diametral overall dimensions of the device, the clutch cylinder is placed around the planetary gear train.

We claim:

1. A power transmission device comprising:
   a fixing housing;
   an input shaft connectable to a source of power;
   an output shaft;
   a sun gear rotatable with said input shaft;
   a ring gear rotatable with said output shaft;
   at least one pinion gear meshing with said sun and ring gears;
   a pinion carrier upon which said at least one pinion gear is mounted;
   a brake disc having friction linings on two sides thereof and mounted on said pinion carrier;
   a clutch disc parallel with said brake disc and having friction linings on two sides thereof and mounted on said pinion carrier;
   nonrotatable brake friction linings mounted on said housing on two sides of said brake disc;
   clutch friction linings mounted for rotation with one of said input and output shafts;
   a brake cylinder in said housing and having a piston engaging one of said brake friction linings on one side of said brake disc;
   a clutch cylinder rotatable with said one of said input and output shafts and having a piston engaging one of said clutch friction linings on side of said clutch disc opposite said one side of said brake disc; and
   spring means for biasing apart said brake friction linings and clutch friction linings,
   whereby said discs are centered between said lining and parasitic drag is reduced.

2. The device of claim 1 wherein said pinion carrier includes a flange which comprises a drawn and stamped sheet metal cover having notches located on a periphery thereof for attachment of said disks.

3. The device according to claim 2 wherein said cover has an annular deformation acting as an oil collector during rotation, said deformation having radial orifices for bringing the oil to said clutch friction linings.

4. The device of claim 2 wherein the brake disk is spaced from the clutch disk in the axial direction.

5. The device according to claim 4 wherein the brake disks is located radially inside of an outside wall of said flange.

6. The device according to claim 5, wherein the brake cylinder is carried by a hub that is an integral part of the housing, said hub having a needle bearing supporting the input shaft.

7. The device of claim 1 wherein the clutch cylinder is rotatable with the input shaft.

8. The device of claim 1 wherein the clutch cylinder is rotatable with the output shaft.

9. The device of claim 1 wherein said brake and clutch discs extend coplanar with one another.

10. The device of claim 1 wherein said clutch and brake discs comprise the same disc.

* * * * *